(12) United States Patent  
Bouat

(10) Patent No.: US 7,573,899 B2  
(45) Date of Patent: Aug. 11, 2009

(54) ADAPTOR MODULE

(75) Inventor: Sebastien Bouat, Crolles (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 1169 days.

(21) Appl. No.: 10/418,958

(22) Filed: Apr. 18, 2003

(65) Prior Publication Data

US 2004/0028196 A1    Feb. 12, 2004

(30) Foreign Application Priority Data

Apr. 23, 2002    (EP)    ................................. 02354065

(51) Int. Cl.
*H04J 3/16*    (2006.01)

(52) U.S. Cl. ................... 370/465; 370/466; 370/467; 370/469; 370/401

(58) Field of Classification Search ................ 370/352, 370/401, 465–467, 469; 379/201.01, 201.02, 379/201.03; 709/250
See application file for complete search history.

(56) References Cited

U.S. PATENT DOCUMENTS

| | | | | |
|---|---|---|---|---|
| 5,619,650 A * | 4/1997 | Bach et al. | ............ | 709/246 |
| 5,621,726 A * | 4/1997 | Murakimi | ............ | 370/255 |
| 5,802,301 A * | 9/1998 | Dan et al. | ............ | 709/223 |
| 5,943,481 A * | 8/1999 | Wakeland | ............ | 709/230 |
| 6,134,618 A | 10/2000 | Hebert | ............ | 710/105 |
| 6,216,170 B1 * | 4/2001 | Giovannoni et al. | ........ | 709/250 |
| 6,621,895 B1 * | 9/2003 | Giese | ............ | 379/201.03 |
| 6,961,776 B1 * | 11/2005 | Buckingham et al. | ....... | 709/229 |
| 7,002,988 B1 * | 2/2006 | Benedyk et al. | ............ | 370/467 |
| 7,177,952 B1 * | 2/2007 | Wurch et al. | ............ | 709/250 |
| 2002/0048360 A1 * | 4/2002 | Zambre et al. | ............ | 379/229 |
| 2002/0156900 A1 * | 10/2002 | Marquette et al. | ........... | 709/227 |
| 2003/0204740 A1 * | 10/2003 | Shapiro et al. | ............ | 713/200 |
| 2005/0078672 A1 * | 4/2005 | Caliskan et al. | ............ | 370/389 |
| 2005/0265341 A1 * | 12/2005 | Benedyk et al. | ............ | 370/389 |

FOREIGN PATENT DOCUMENTS

| | | |
|---|---|---|
| EP | 0 620 693 A2 | 10/1994 |
| EP | 0 663 750 A2 | 7/1995 |
| WO | 02/11459 A1 | 2/2002 |

* cited by examiner

*Primary Examiner*—Edan Orgad  
*Assistant Examiner*—Chuong T Ho

(57) ABSTRACT

An adaptor module for use with a service manager adapted to functionally lie between a service application operable to provide a service and a network layer of a telecommunication network service entity, the adaptor module being operable to; receive from the service manager a service output message generated by the service application, map the service output message to a corresponding network input message accepted by the network layer, and pass the network input message to the service manager for transmission to the network layer.

11 Claims, 5 Drawing Sheets

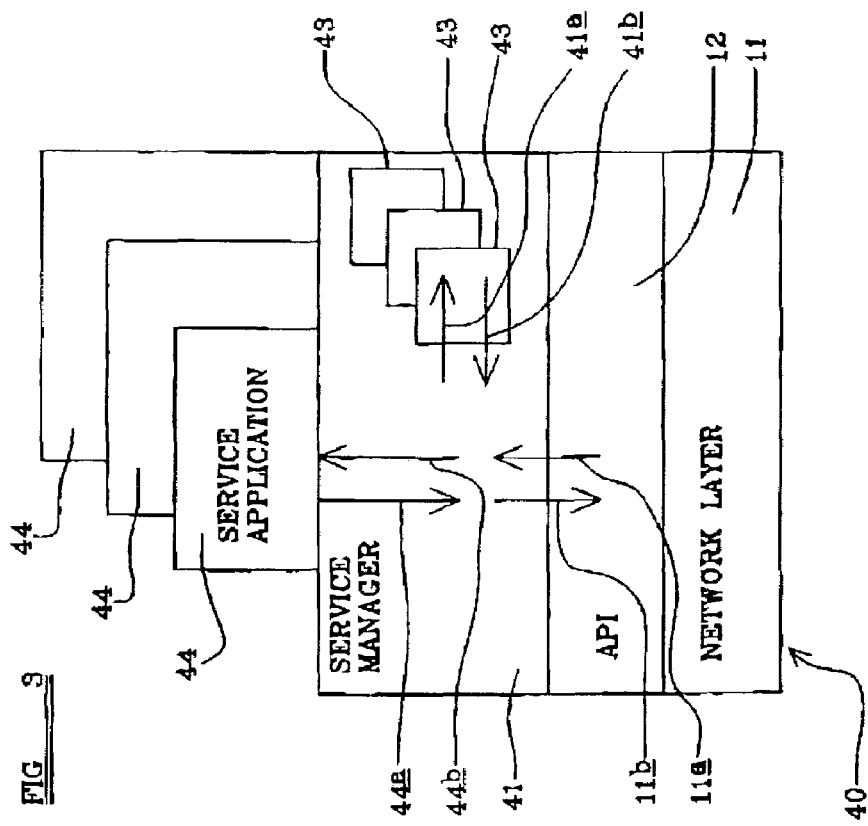
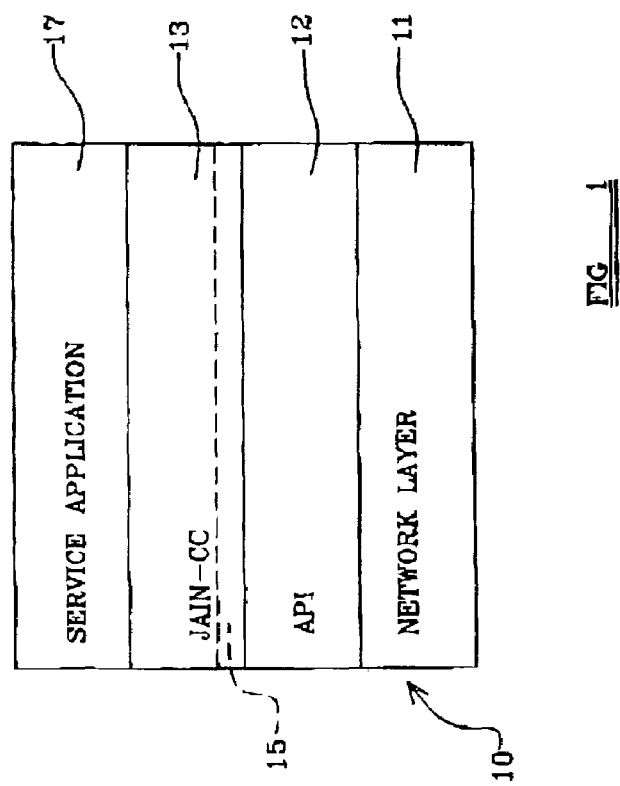
FIG. 3
FIG. 1

US 7,573,899 B2

ADAPTOR MODULE

FIELD OF THE INVENTION

This invention relates to an adaptor module for a service manager for a telecommunication network service entity, a service manager and a method of generating an adaptor module.

BACKGROUND OF THE INVENTION

With the development of telecommunication networks, it has become increasingly desirable for the network operators to offer additional services to network users in addition to the provision of voice and data calls. Such services include such functions as 0800 numbers, call forwarding, virtual private networks, and conference calls. Such services offer a greater range of functions to users of the network and consequently increase use and revenue for the operator.

Such services may be provided by appropriate service applications operating at appropriate network entities in a communication network, for example at a service control point (SCP) in an SS7 public switched telephone network (PSTN) or at a soft switch in a packet network, for example a VoIP network. Such entities are hereinafter referred to as "telecommunication network service entities". The service may be performed by a service application distributed across a number of entities.

In the following specification, the software required to provide network functions for a network entity will be referred to as the "network layer" The network layer communicates with other network entities to provide call control functionality, call establishment, routing and so forth. The network layer is provided by a developer who publishes an application programming interface (API) for the network layer to enable third parties to write applications, particularly service applications, to sit on top of the network layer. Such an API is conventionally at a relatively low level, that is, it defines a large number of relatively simple input messages or instructions accepted by the network layer and will publish a large number of information elements, that is output messages relating to individual aspects of the call status and call and network parameters, in accordance with an appropriate protocol. A service application can be written using the published API and can be implemented in conjunction with a service manager which is functionally located between the network layer and service application. However, such a service application will then not be fully portable across different network layers and service managers provided by different developers. To encourage the development of service applications, it is desirable to these service applications be portable that is useable across a range of network entities and network layers from different suppliers.

To provide for portable service applications, it is known to provide a further API which sits on top of the network layer to provide a network layer independent API. An example is JAIN-CC (TM). An example of a stack for JAIN-CC is shown at FIG. 1. Referring to FIG. 1, the stack 10 comprises at its lowest level the network layer 11, provided with the vendor specific API, hereinafter referred to as a protocol API 12. To provide a higher level of abstraction, JAIN-CC 13 sits on top of the protocol API 12 and provides a defined generic call processing API. At its lower edge, JAIN-CC 13 is provided with an appropriate adaptor 15 to convert messages to and from the relatively high level call processing API to appropriate specific input or output messages for the protocol API 12. A service is provided by a service application, shown at 17. In the example of JAIN-CC, the relatively high level abstraction is performed by defining four "object" types which make up a call and which are addressed by a service application 17 using Java message calls. The service application 17 detects network events by establishing listener "objects" which trap Java events generated by the call processing API in response to underlying network events which have been notified to JAIN-CC by the network layer 11 via the protocol API 12.

While the JAIN-CC API is highly flexible, the level of abstraction provided by the API may be too high for some service applications. In particular, a service application may not be able to access service-specific information required from the network layer 11.

An aim of the present invention is to provide an appropriate level of abstraction for a service application which is independent of the network layer.

SUMMARY OF THE INVENTION

According to a first aspect of the invention, we provide an adaptor module for use with a service manager adapted to functionally lie between a service application operable to provide a service and a network layer of a telecommunication network service entity, the adaptor module being operable to receive from the service manager a service output message generated by the service application, map the service output message to a corresponding network input message accepted by the network layer, and pass the network input message to the service manager for transmission to the network layer.

The content of the message comprises one or more information elements, where an information element is a self contained piece of information. The step of mapping one message to another may encompass the steps of selecting one or more information elements from one or more messages and generating a further message as appropriate, and it is intended that the terms "map" and "mapping" should be read in this manner.

The network layer may be operable to receive a plurality of network input messages and the adaptor module may be operable to map the service output message only to a corresponding one of a defined subset of the plurality of network input messages.

The adaptor module may be operable to receive from the service manager a network output message generated by the network layer, map the network output message to a corresponding service input message accepted by the service application, and pass the service input message to the service manager for transmission to the service application.

The adaptor module may be operable to generate a plurality of network output messages and wherein the adaptor module is operable to map the network output message to a corresponding service input message only if the network output message comprises one of a defined subset of the plurality of network output messages.

The adaptor module may be operable to pass the network input message or service input message to the service manager in a format accepted by the network layer or service application respectively.

The adaptor module may be operable to receive a plurality of service output messages or network output messages and combine the plurality of output messages into a single network input message or service input message respectively.

According to a second aspect of the invention, we provide a service manager and comprising an adaptor module according to the first aspect of the invention wherein the service manager is adapted to functionally lie between a service application operable to provide a service and a network layer of a telecommunication network service entity, the service manager being operable to receive a service output message generated by the service application and pass the service output message to the adaptor module, receive a corresponding network input message from the adaptor module and pass the corresponding network input message to the network layer.

The service manager may be operable to receive a network output message generated by the network layer and pass the network output message to the adaptor module, receive a corresponding service input message from the adaptor module and pass the corresponding service input message to the service application.

The service manager may comprise a plurality of adaptor modules, where the service manager is to interact with a plurality of service applications.

According to a third aspect of the invention, we provide a method of operating an adaptor module according to the first aspect of the invention comprising the steps of taking as an input a service application finite state machine and service application message set of the service application, taking as an input a network layer finite state machine and a network layer message set of the network layer, comparing the service application finite state machine and the network layer finite state machine to identify states of the network layer finite state machine corresponding to states of the service application finite state machine, and to identify required transitions in the network layer finite state machine corresponding to transitions in the service application finite state machine, identifying the messages of the service application message set corresponding to the transitions of the service application state message, and defining a subset of the network layer message set wherein the subset of the network layer message set correspond to the required transitions in the network layer finite state machine, and comparing the service application message set and the subset of the network layer message set to identify corresponding messages of the service application message set the subset the network layer messages.

BRIEF DESCRIPTION OF THE DRAWINGS

An embodiment of the present invention will now be described by way of example only with reference to the accompanying drawings wherein;

FIG. 1 is a diagrammatic illustration of a known network stack comprising a network-layer-independent API, FIG. 3 is a diagrammatic illustration of a stack embodying the present invention.

DETAILED DESCRIPTION OF THE PREFERRED EMBODIMENTS

Figure 2:
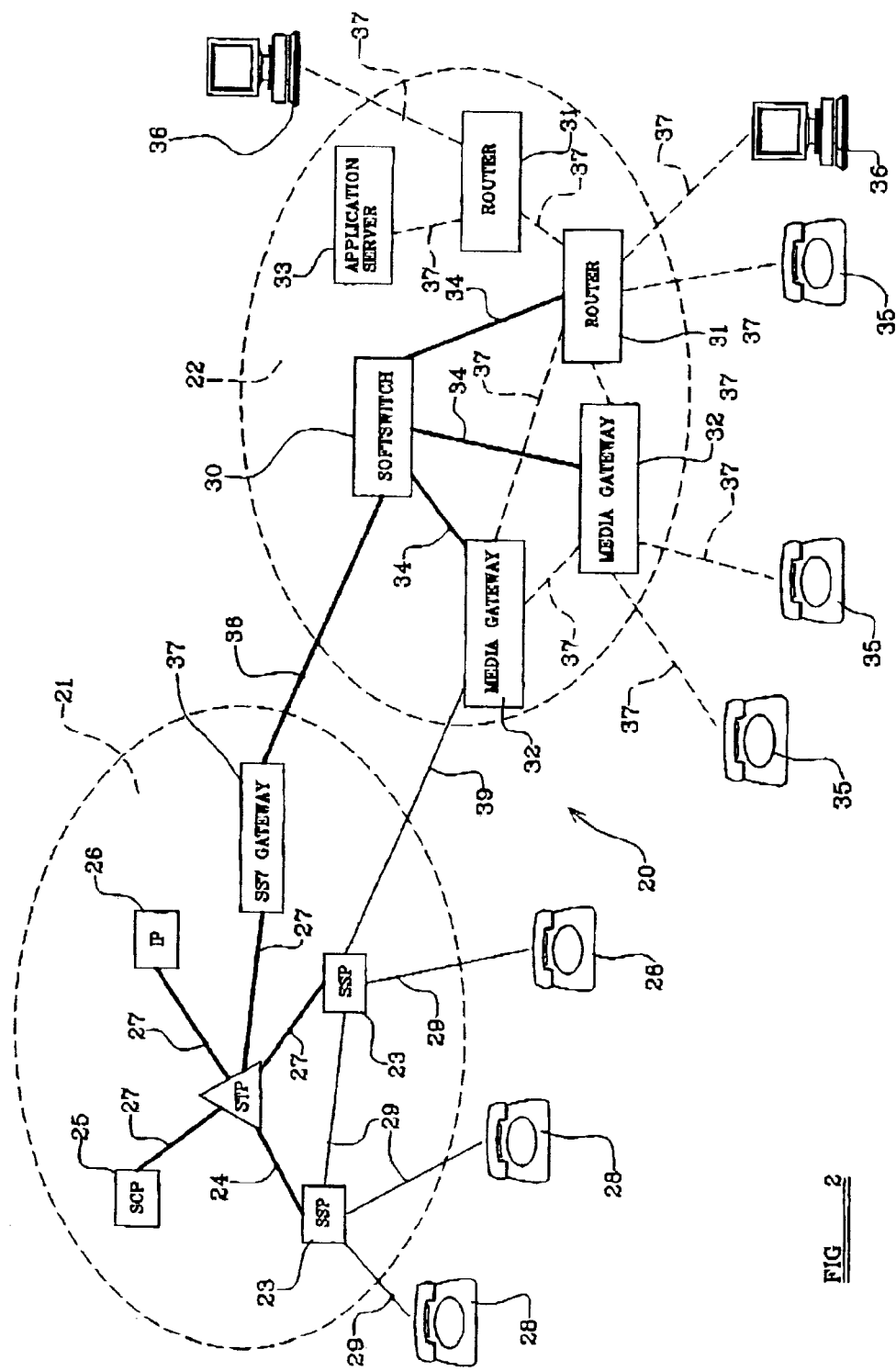
FIG. 2 is simplified illustration of a telecommunication network of known type.

Referring now to FIG. 2, a simplified telecommunication network is generally illustrated at 20, comprising a PSTN 21 and a packet network 22. In conventional manner, in accordance with the SS7 protocol, the PSTN network comprises service switching points ('SSP's) 23, service transfer points ('STP's) 24, a service control point ('SCP') 25 and an intelligent peripheral ('IP') 26. The SSP's 23, STP 24, SCP 25 and IP 26 are all connected by SS7 signalling links 27. The SSP's 23 and user telephones 28 are connected by appropriate voice links 29. The packet network 22 comprises a soft switch 30 which provides a call control function, a plurality of routers 31, a plurality of media gateways 32 and an application server 33. The soft switch 30 is connected to the routers 31 and media gateways 32 through appropriate signalling packet links 34, and the routers 31, media gateways 32, application server 33, user telephones 35 and user computers 36 are interconnected by voice packet links 37. To connect the networks 21, 22, the PSTN network 21 is provided with an SS7 gateway 37 which is connected by an appropriate signalling link 38 to the soft switch 30, for example using the SIGTRAN protocol, whilst an SSP 23 is connected to a media gateway 32 via an appropriate TDM voice link 39.

In the telecommunication network 20, it is known to provide services as may be desired at any appropriate entity. For example services may be provided at the SCP 25 or IP 26 of the PSTN network 21 and at the soft switch 30 or application server 33 of the packet network 22. It is also possible to provide service applications elsewhere on the network, for example at an SSP 23 if appropriate. Further, to provide a service, the service application need not be provided at one entity but may be provided distributed across a number of entities, for example on the SCP 25 and IP 26 and implemented by signalling between the two entities through the appropriate signalling links 27.

In the present specification the term "network entity" is intended to be broadly understood to refer to any appropriate entity whether physically or logically distributed or otherwise where call control functionally is provided, and "network layer" to the control software running on that entity.

Referring now to FIG. 3, a stack 40 is shown provided with a network layer 11 as discussed hereinbefore provided with a protocol API 12 which is operable to receive network input messages 11a comprising instructions to the network layer 11 and pass network output messages 11b comprising information relating to the call status and network layer and call parameters. Located above the protocol API 12 is a service manager 41. The service manager 41 is provided with a plurality of adaptor modules 43. Running on top of the stack 40 is a plurality of service applications 44, which similarly are each operable to generate service application output messages 44a comprising instructions to the network layer 11 and receive service application input messages 44b comprising call status information. The content of the messages comprises information elements, where an information element is a self contained piece of information. Each message may comprise a plurality of information elements. The service application message set comprising all possible information elements, service application input messages 44a and service application output messages 44b, and the network layer message set comprising all possible information elements, network input messages 11a and all possible network layer output messages 11b will not have a one-to-one correspondence, nor need message sets be necessarily in a common format accepted by both the service application 44 and the network layer 11.

The service manager 41 is operable to provide ail intermediate layer which functionally lies between the network layer 11 and one or more service applications 44. In particular, the service manager is operable to route messages to and from the correct service applications 44 and the network layer 11 and ensure that the service applications 44 can implement only well defined and bounded instructions or features provided by the network layer 11 to ensure the reliability and stability of the stack 40. The service manager 41 also provides a resource management service, where several service applications are running in the stack 40. Other function may be provided as desired, for example database and information logging services.

The service manager 41 in this embodiment is generic between network layers and services, that is may be used in a selected one of a number of different combinations of service applications 44 and network layers 11. To enable the service manager 41 to be used with a desired combination of a service application 44 and a network layer 11, the service manager 41 is provided with an adaptor module 43 which is intended for use with that combination of service application 44 and network layer 11. As will be described in more detail below, in the present example an adaptor module 43 is produced by comparing the finite state machine and message set of the service application 44 with the finite state machine and message set of the network layer 11.

When a service application 44 is run on the stack 40, the service application 44 identifies the required adaptor module 43 as part of an initial "handshaking" procedure. The service manager 41 will then check the availability of the adaptor module 43 and load it. Where a plurality of service applications 44 are running on the stack 40, a different adaptor module 43 may be provided for each service application 44 or a single adaptor 43 may be used by more than one service application 44 if the service applications 44 have the same requirements of the network layer 11. It might also be envisaged that an adaptor module 43 is operable to be usable with more than one different service application required.

On receipt of a service application output message 44b, the service manager 41 will pass the service application output message 44b to the appropriate adaptor module 43 as shown by arrow 41a. The adaptor module 43 will process the service application output message 44b. In particular, the adaptor module 43 will identify the corresponding network layer input message 11a and may perform other steps such as providing any information included in the service application output message 44b in the right format in the network layer input message 11a. The adaptor module 43 will then pass the message to the service manager 41 as shown by arrow 41b and the service manager 41 will pass the network layer input message 11a to the protocol API 12. Similarly, when a network layer output message 11b is received by the service manager 41, it will pass the message to the adaptor module 43 which will generate the corresponding service application input message 44a and pass it to the service manager 41 to be published to the service application 44. The adaptor module 43 may also be operable at the information element level, that is the adaptor module 43 is able to select appropriate information elements from one or more output messages and copy the or each information element into an appropriate input message in an appropriate format.

Each adaptor module 43 is only operable to generate a network layer input message 11a from a defined subset of all possible network layer input messages, and only pass on a network layer output message 11b which falls within a defined subset of all possible network layer output messages. The only information elements passed to and from the service application 44 are those required by the service application 44 to offer the service and so may be optimised for that particular service. The adaptor module 43 likewise need only accept and generate a subset of the network layer messages, i.e. only those required for to pass the necessary information elements for operation of the corresponding service application 44. The service application 44 thus interacts with what will appear to the service application 44 to be a specific, optimised, API designed for that service, providing an appropriate level of abstraction from the protocol API 12 for that service application 44. Because the mapping between the message sets of the service application 44 and the network layer 11 is performed at the adaptor module 43, the service application 44 is minimally dependent on the network layer 11, and is hence easily portable to other stacks with other network layers by the provision of an appropriate adaptor module 43.

The present invention thus provides a generic service manager, and allows the operation of a plurality of service applications 44 with message sets which may be mutually incompatible as well as incompatible with the message set of the network layer 11 to be run on the same stack 40 by the provision of an appropriate adaptor module 43 for each service application 44. Because the adaptor module 43 in only mapping a defined subset of the network layer output messages to corresponding service application input messages, performs in effect a filtering function, no extraneous or unnecessary information is passed to the service application 44.

A method embodying the present invention of providing adaptor module 43 embodying the present invention will now be described by way of example with reference to FIGS. 4, 5 and 6.

In broad terms, it is required that the adaptor module 40 is operable to map service application output messages to corresponding network layer input messages and similarly map network layer output messages to corresponding software application input messages. The network layer input messages and network layer output messages corresponding to messages in the service application message set will be only a subset of all possible messages in the network layer message set, and so to optimise the adaptor module 43 it is desirable that it is only operable to process network layer messages within that subset.

Figure 4:
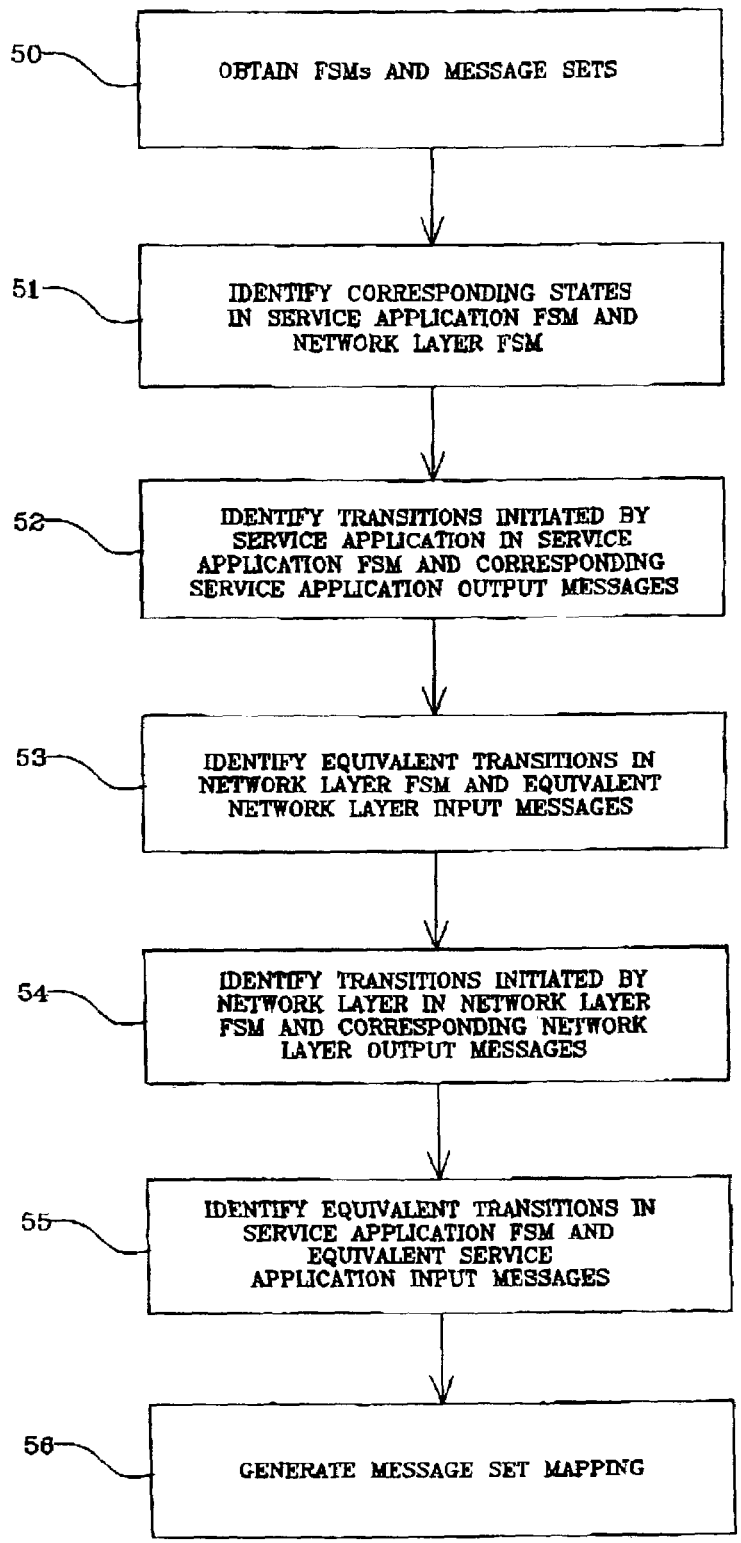
FIG. 4 is a flow diagram for a method of generating an adaptor module embodying the present invention.

To identify the subset of the network layer message set corresponding to the software application message set, and to produce a mapping between corresponding messages, the first step as shown at 50 in FIG. 4 is to take as inputs the finite state machines and message sets of the network layer 11 and service application 44. At step 51, the finite state machines are mapped to identify which states of the network layer finite state machine correspond to states of the service application finite state machine.

In operation, it is of course desirable that the network layer 11 and service application 44 be in corresponding states of their respective state machine. Thus, where the service application 44 undergoes a transition between states, it is desirable for a message to be passed to the network layer 11 to cause a corresponding transition. Similarly, when the network layer 11 undergoes a transition, for example as a result of a network event, and publishes an appropriate message, the service application 44 must undergo a similar transition in response to that message. At step 52 therefore, those transitions in the service application service application which are required and are initiated by the state machine are identified and the corresponding service application output messages identified. At step 53, the equivalent transitions in the network layer state machine and the equivalent network layer input messages are identified. Similarly, at step 54 those transitions in the network layer state machine which are initiated by the network layers are identified and the corresponding network layer output messages are identified, and at step 55 the corresponding transitions in the service application state machine service application input messages are identified. At step 56, the mapping between network layer output messages and service application input messages, and service application output messages and network layer input messages is established. These steps may of course be combined or performed in any desired order as appropriate or convenient.

It will be apparent that each input message must correspond to at least one output message, but that some aggregation of messages may occur. For example, where the network layer undergoes a series of transitions and generates a plurality of network layer output messages which correspond to a single transition and single service application input message in the service application state machine, the adaptor module 43 may aggregate all the network layer output messages into a single service application input message.

The method will now be described with reference to FIGS. 5 and 6 to illustrate the example of mapping a finite state machine for a virtual private network, shown in FIG. 6 to a finite call machine for a network layer shown in FIG. 5. In each case, the finite state machine is simplified for illustrative purposes. Input messages associated with a state machine transition have the prefix "In:" and output messages the prefix "out:"

Figure 5:
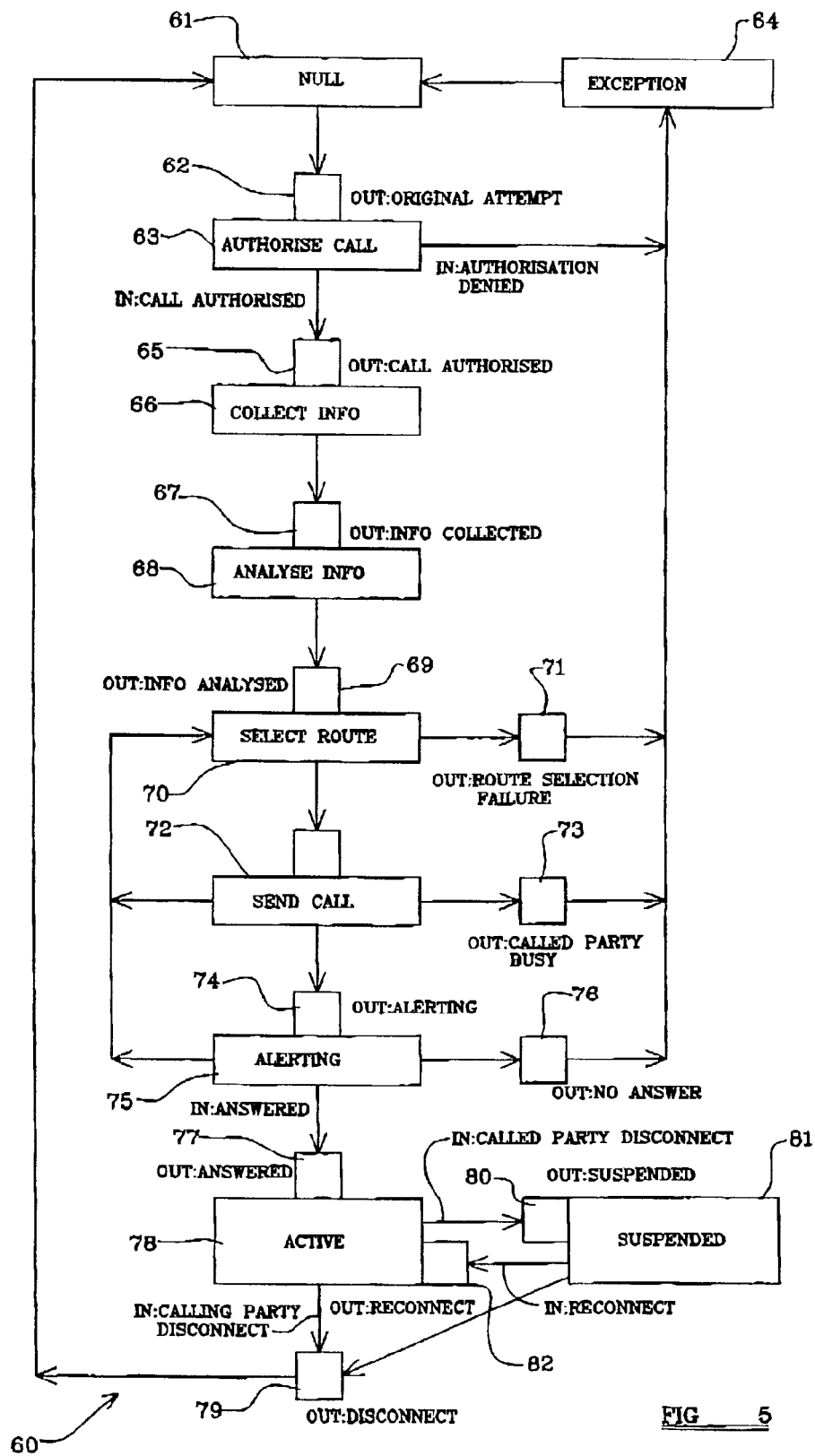
FIG. 5 is a simplified finite state machine of known type for originating a call for a network layer.

Referring now to FIG. 5, a simplified finite state machine ("FSM") for a network layer 11 is generally shown at 60. The finite state machine 60 has two kinds of states, point in call ("PIC") states where an action is performed by the network layer, and detection point ("DP") states where network and call information is transmitted and passed by the network layer 11 to the service manager 41 in the form of network layer output messages. Further, a trigger may be set at appropriate states in the FSM 60 so that the network 11 waits for a response before transiting to the next state. The FSM in FIG. 5 has been simplified for illustrative purposes, and in practise the FSM for a network layer may be more complex.

In FIG. 5, the network layer is initially in a null state 61 where no call is being handled. On receipt of a call attempt, for example digits being dialled, at detection point 62 a network layer output message is generated indicating that an attempt is being made to originate the call and including appropriate information. At PIC 63 the call is authorised. Where an appropriate trigger is set in this state, the network layer 11 then makes an external authorisation request, for example to a service application 44. In response to an input message the network layer may either transit to an "Exception" state 64 in which the network layer is reset and an error message transmitted before returning the null state 61 if the call is not authorised or, if the call attempt is authorised, then at detection point 65 an output message is generated indicating that the attempt has been authorised and at step 66 the network layer collects further information, for example additional digits as required. The network layer transitions to detection point 67 where an output message indicating information has been collected is generated and at PIC 68 the collected information, if any, is analysed. At detection point 69, an output message is generated indicating that the collected information has been analysed and including other appropriate information and at PIC 70 a route is selected to connect to the desired number. In the event of a failure, the network layer passes to detection point 71 where an output message is generated indicating a route failure and then passes to PIC 64. When a route is selected, the network layer moves to PIC 72 where the call is set up. If a message is received from the network at the network layer 11 indicating that the called party is busy, the network layer 11 undergoes a transition to detection point 73 where it generates an output message that the called party is busy and then passes to PIC 64. If the called party is not busy, at detection point 74 an output message is generated indicating that the called number is being alerted and the network layer then passes to PIC 75 where the network layer 11 waits for an answer. If there is no answer, for example within a timed period, then at detection point 76 an output message is generated indicating that no answer has been received, and the network layer passes to PIC 64. If in PIC 72 or 75 the selected route cannot be established, then the network layer returns to state 70 to select a further route.

When the call is answered, at DP 77 an output message is generated indicating that the call has been answered and the network layer moves to the "active" PIC 78 where the call is established an-d answered. When the call is disconnected by a calling party, then on receipt of an input message the network layer transitions to detection point 79 which generates a message indicating that the call is being disconnected, and then returns to the null PIC 61. If the called number attempts to disconnect, in response to a corresponding input message the network layer moves from PIC 78 to detection point 80 where an output message indicating that the call has been suspended is generated, and then moves to PIC 81 where the call is suspended. The call may then be reconnected and, in response to an input message, the network layer 11 moves to detection point 82 where an output message is generated indicating that the call has been reconnected and returns to the active PIC 78. Alternatively, as a result of a time out, the network layer may move to detection point 79 and generate an output message that the call has been disconnected as before.

Figure 6:
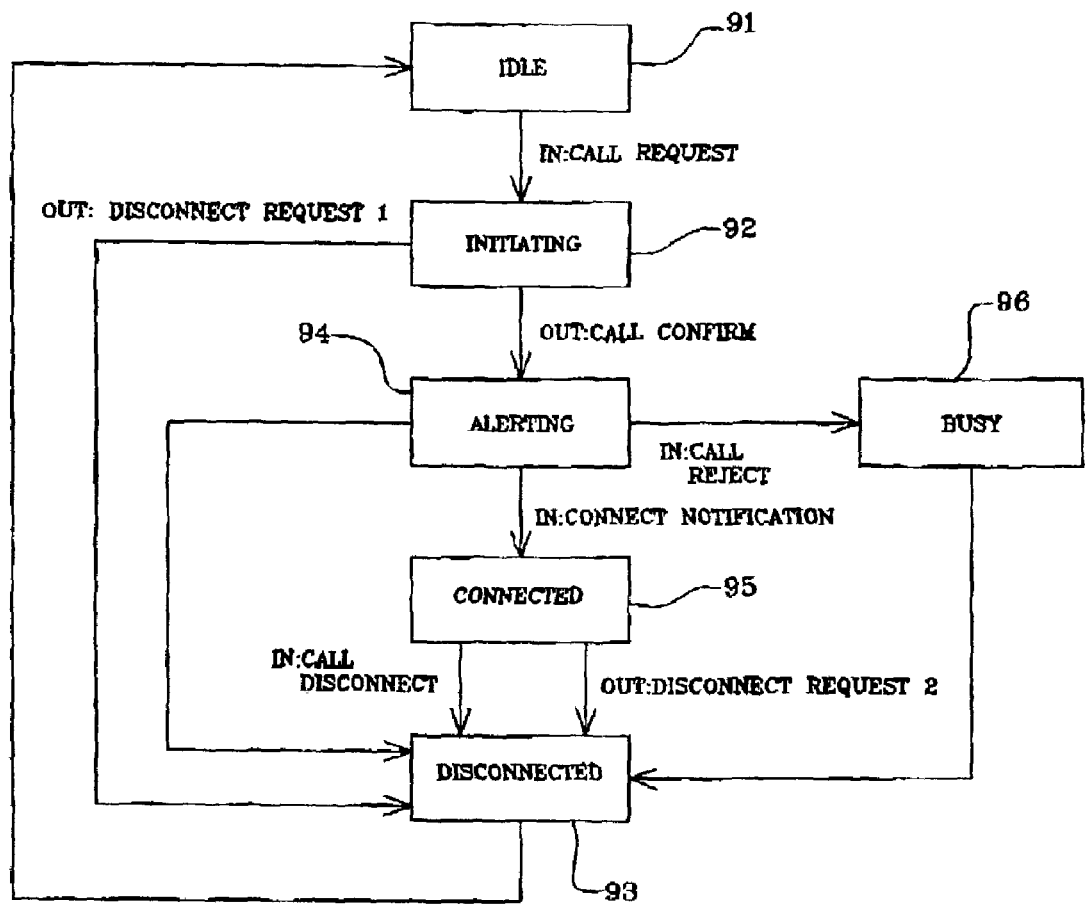
FIG. 6 is a simplified finite state machine of known type for a virtual private network.

Referring now to FIG. 6, a finite state machine for a service application providing a virtual private network ("VPN") as generally shown at 90. In state 91, the service application is in an idle state, where no call is being handled. In response to an input message, that a call is being requested and including the dialled number and a caller identification, the service application is moved to the initiating state 92. In this state the service application can reject the request in which case an output message comprising a disconnect request is generated and the application generates transitions to the disconnected states 93. Alternatively, the service application can accept the request and, in the case of a virtual private network, returns a call confirm message including the actual call number corresponding to the virtual private network number dialled and included in the call request message. The service application 44 then moves to the alerting state 94 where it is waiting for the call to be connected. In response to a connect notification message confirming that the call has been connected, the service application 44 moves to the connected state 95. In response to a input message comprising a call disconnected notification or by generating an output message comprising a disconnection request the service application undergoes a transition to the disconnected state 93. In the alerting state 94, if an input message comprising a disconnection notification is received the service application 44 moves to the disconnected state 93, or if a input message is received that the call has been rejected, the service application 44 moves to the busy state 96 and will then transition to the disconnected state 93. In the disconnected state 93 the service application may perform administrative functions such as logging the call destination and time, recording, charging information etc.

TABLE 1 mapping states of VPN FSM and network layer FSM

| VPN FSM | Network Layer FSM |
| --- | --- |
| Idle 91 | Null 61 |
| Initiating 92 | DP "Out: origination attempt" 62 |
| Alerting 94 | Select Route 70 |

TABLE 1-continued mapping states of VPN FSM and network layer FSM

| VPN FSM | Network Layer FSM |
|---|---|
| Busy 96 | DP "Out: route selection failure" 71 |
| Connected 95 | DP "Out: answer" 76 |
| Disconnected 93 | DP "Out: disconnect" 79  Exception 64 |

The mapping of the states of the VPN FSM 90 to equivalent states of the network layer FSM 60 is shown in Table 1. It is then possible to match the message sets to identify service application output messages which correspond to transitions in the VPN FSM 90 and identify the corresponding network layer input messages to cause corresponding transitions in the network layer FSM 60. Similarly, where a transition occurs in the network layer FSM 60 and there is a corresponding transition which should occur in the VPN FSM 60, it is possible to match the network layer output message to the corresponding service application input message. The table mapping the VPN message set to the subset of the network layer message set is shown at Table 2 below. Table 2 provides the basis for the adaptor module 43 so that output messages from the service application 44 are matched to the input messages accepted by the network layer 11 and vice versa.

TABLE 2 mapping message set of VPN FSM and network layer FSM.

| VPN Message Set | Network Layer Message Set |
|---|---|
| In: call request | Out: origination attempt |
| Out: disconnection request 1 | In: authorisation denied |
| Out: call confirm | In: call authorised |
| In: connect notification | Out: answered |
| In: disconnect notification | Out: no answer, |
| | Out: route selection failure |
| In: call reject | Out: called party busy |
| In: call disconnect | Out: disconnect |
| Out: disconnect request 2 | In: calling party disconnect, |
| | In: calling number disconnect. |

It will be apparent that about half of the network layer message set and a subset of the message content or information elements is not relevant to the service application as is apparent from considering the mapping of the finite state machines, and so the Table 2 only contains a subset of the message set of the network layer finite state machine. It will also be apparent that although each state in Table 1 and each message in Table 2 is matched with at least one other state or message, there is not necessarily a one-to-one mapping between states and between messages. The states of the network layer FSM state machine 60 which are of no relevance to the VPN FSM 90, or multiple states in the network layer FSM which are equivalent to a simple state in the VPN FSM 90, are masked from the service application. For example, the transition in the VPN FSM 90 from alerting state 94 to connected state 95 requires the network layer FSM 60 to pass through a number of intermediate states between the equivalent states 70, 76. These intermediate states are not apparent to the service application 44. Those messages in the network layer FSM message set which are of no relevance to the service application 44 are similarly masked.

Although in this example the service described is a virtual private network, it will be apparent that the invention may be used with a service application implementing any desired service. It is envisaged in the present example that the adaptor module comprises a library of C routines called by the service manager in accordance with the received messages from the service application or network layer, but the adaptor module may be implemented in any appropriate manner as desired. The adaptor module may be optimised for a particular service application, or may recognise a generic service message set if desired. The service manager is thus generic across all network layers and service applications, and may be used with any combination of service application network layer providing an appropriate adaptor module is provided.

In the present specification "comprises" means "includes or consists of" and "comprising" means "including or consisting of".

The features disclosed in the foregoing descriptions or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A telecommunication network service entity device, comprising:
    a plurality of adaptor modules configured to execute in a stack in the telecommunication network service entity device, the plurality of adaptor modules being configured for communicating with a service manager that functions within the stack and are configured to functionally lie in said service manager between a layer of a plurality of service applications in the stack and a network layer in the stack, where each service application provides a service;
    the plurality of adaptor modules each being configured to:
    associate each of themselves with a selected one of said plurality of service applications,
    receive from the service manager a service output message generated by a service application associated with a particular adaptor module,
    map the service output message to a corresponding network input message accepted by the network layer, and
    pass the network input message to the service manager for transmission to the network layer;
    wherein the network layer is operable to receive a plurality of network input messages and wherein each adaptor module is operable to map the service output message only to a corresponding one of a defined subset of the plurality of network input messages.

2. A telecommunication network service entity device according to claim 1, each adaptor module being configured to:
    receive from the service manager a network output message generated by the network layer,
    map the network output message to a corresponding service input message accepted by the service application, and
    pass the service input message to the service manager for transmission to the service application.

3. A according to claim 2 wherein the network layer is configured to generate a plurality of network output messages and wherein the adaptor module is configured to map the network output message to a corresponding service input message only if the network output message comprises one of a defined subset of the plurality of network output messages.

4. A telecommunication network service entity device according to claim 1 wherein the adaptor module is configured to pass the network input message or service input message to the service manager in a format accepted by the network layer or service application respectively.

5. A telecommunication network service entity device according to claim 1 wherein the adaptor module is configured to receive a plurality of service output messages or network output messages and combine the plurality of output messages into a single network input message or service input message respectively.

6. A service manager comprising the plurality of adaptor modules according to claim 1, the service manager being configured to functionally lie in the stack between said plurality of service applications and a network layer of said telecommunication network service entity device, the service manager being configured to:
   receive a service output message generated by one of said service applications and pass the service output message to the adaptor module associated with said one of said service applications,
   receive a corresponding network input message from the adaptor module associated with said one of said service applications and
   pass the corresponding network input message to the network layer.

7. A service manager according to claim 6, the service manager being configured to receive a network output message generated by the network layer and pass the network output message to the adaptor module associated with said one of said service applications, receive a corresponding service input message from the adaptor module associated with said one of said service applications and pass the corresponding service input message to the associated service application.

8. A telecommunication service network entity comprising:
   a plurality of service applications operable each to provide a service;
   a network layer operable to receive a plurality of network input messages and generate a plurality of network output messages;
   a plurality of adaptor modules; and
   a service manager adapted to functionally lie between the service application and the network layer and operable to:
      receive service output messages generated by the service applications and pass the service output messages to a selected one of said adaptor modules, the selected one of said adaptor modules being selected by its associated service application;
      receive corresponding network input messages from the selected adaptor module and pass the corresponding network input messages to the network layer;
      receive network output messages generated by the network layer and pass the network output messages to the selected adaptor module; and
      receive corresponding service input messages from the selected adaptor module and pass the corresponding service input messages to the associated service application, wherein each adaptor module is operable to receive from the service manager service output messages generated by associated service applications, map the service output messages only to a corresponding one of a defined subset of the plurality of network input messages and pass the network input message to the service manager in a format accepted by the associated service application for transmission to the associated service application, the selected adaptor module being further operable to receive from the service manager a network output message generated by the network layer, map the network output message to a corresponding service input message accepted by its associated service application only if the network output message comprises one of a defined subset of the plurality of network output messages, and pass the service input message to the service manager in a format accepted by the network layer for transmission to the network layer.

9. A telecommunications network service entity according to claim 8 wherein at least one adaptor module is to receive a plurality of service output messages or network output messages and combine the plurality of output messages into a single network input message or service input message respectively.

10. A telecommunications network service entity as claimed in claim 8 wherein the service application comprises means to specify to the service manager a required adaptor module from the plurality of adaptor modules for use with that service application.

11. A method of generating an adaptor module, the method comprising the steps of:
   taking, by a telecommunication network service entity device, as an input a service application finite state machine and service application message set of the service application,
   taking, by the telecommunication network service entity device, as an input a network layer finite state machine and a network layer message set of the network layer,
   comparing, by the telecommunication network service entity device, the service application finite state machine and the network layer finite state machine to identify states of the network layer finite state machine corresponding to states of the service application finite state machine, and to identify required transitions in the network layer finite state machine corresponding to transitions in the service application finite state machine,
   identifying, by the telecommunication network service entity device, the messages of the service application message set corresponding to the transitions of the service application state machine, and
   defining, by the telecommunication network service entity device, a subset of the network layer message set wherein the subset of the network layer message set corresponds to the required transitions in the network layer finite state machine, and comparing, by the telecommunication network service entity device, the service application message set and the subset of the network layer message set to identify corresponding message of the service application message set and the subset of the network layer message set.

* * * * *